United States Patent [19]
Corcoran

[11] 4,015,115
[45] Mar. 29, 1977

[54] PICTURE PHONE
[75] Inventor: Donald Gerald Corcoran, Montvale, N.J.
[73] Assignee: International Telephone and Telegraph Corporation, Nutley, N.J.
[22] Filed: Dec. 9, 1975
[21] Appl. No.: 639,151
[52] U.S. Cl. .......................... 250/199; 178/DIG. 2; 179/2 TV; 350/96 BC; 358/257
[51] Int. Cl.[2] .................................. H04B 9/00
[58] Field of Search ............... 250/199, 213 R; 178/5.6, DIG. 2; 179/2 TV, 1 H; 350/96 BC

[56] References Cited
UNITED STATES PATENTS

| | | | |
|---|---|---|---|
| 1,352,841 | 9/1920 | Silver | 350/122 |
| 1,981,999 | 11/1934 | French | 250/199 |
| 3,043,179 | 7/1962 | Dunn | 178/DIG. 2 |
| 3,748,016 | 7/1973 | Rossire | 350/96 BC |
| 3,803,407 | 4/1974 | Anderson | 350/96 BC |

Primary Examiner—Robert L. Richardson
Attorney, Agent, or Firm—John T. O'Halloran; Alfred C. Hill

[57] ABSTRACT

The basic picture phone includes at least one input image intensifier having an image of a picture to be transmitted optically coupled to its input. An intensity amplified version of the image appears at the output of the input intensifier which is transmitted by a coherent fiber optic transmission line to at least one output image intensifier which intensity amplifies the transmitted image and reproduces the amplified transmitted image for presentation to an observer. Speech is converted to speech modulated light which is coupled to the input intensifier for intensity amplification, transmitted together with the transmitted image along the coherent fiber optic transmission line to the output intensifier for intensity amplification and then is converted back to speech for utilization. A monochromatic embodiment, a field sequential color embodiment and a simultaneous color embodiment are disclosed.

41 Claims, 5 Drawing Figures

PICTURE PHONE

BACKGROUND OF THE INVENTION

This invention relates to communication systems and more particularly to a combined picture and speech communication system, such as a picture phone.

Prior art combined picture and speech communication systems (picture phones) have employed for picture transmission vidicons and image orthicons to generate video electrical signals for transmission to cathode ray (television) receivers. The disadvantage of such systems are that the components and the system are electronically complex; are susceptible to radio frequency interference and cross-talk; and lack inherent security. These components and system are also susceptible to nuclear blast, lightning electromagnetic pulse damage and the like.

SUMMARY OF THE INVENTION

An object of the present invention is to provide a picture phone overcoming the above-mentioned disadvantages of prior art picture phones.

Another object of the present invention is to provide a picture phone employing fiber optic techniques.

Still another object of the present invention is to provide a monochromatic picture phone employing fiber optic techniques.

Still another object of the present invention is to provide a colored image picture phone employing fiber optic techniques.

A feature of the present invention is the provision of a picture communication system comprising: at least a first image intensifier; first means to optically couple an image of an illuminated picture to be transmitted to the input of the first intensifier; the first intensifier providing an intensity amplifier version of the image at the output thereof; a coherent fiber optic transmission line having one end thereof optically coupled to the output of the first intensifier to transmit the amplified version of the image to the other end thereof; and at least a second image intensifier having its input optically coupled to the other end of the transmission line to intensity amplify the transmitted image at the other end of the transmission line and to reproduce the amplified transmitted image for presentation to an observer.

Another feature of the present invention is the provision of a speech communication system in combination with the above described picture communication system wherein the speech communication system includes a speech to light converter coupled to a speech source to convert speech into speech modulated light; a first fiber optic cable coupled from the speech to light converter to the input of the above mentioned first intensifier to convey the speech modulated light to the first intensifier for amplification prior to transmission on the above-mentioned coherent fiber optic transmission line together with the above-mentioned transmitted image; a second fiber optic cable coupled to the output of the above-mentioned second intensifier where the second intensifier amplifies the transmitted speech modulated light; a light to speech converter coupled to the output of the second cable to reproduce the original speech; and a utilization device coupled to the output of the light to speech converter to utilize the speech.

The advantages of the picture phone of the present invention is the simplicity of the fiber optic proximity focused image intensifier which facilitates image amplification, transmission over a coherent fiber optic transmission line and reconversion to a visible image at the receiver for viewing by an observer. Both the transmitter and receiver employ identical fiber optic proximity focused image intensifiers. The components of the system of the present invention are electrically isolated from each other and are inherently secure, safe and shock free.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
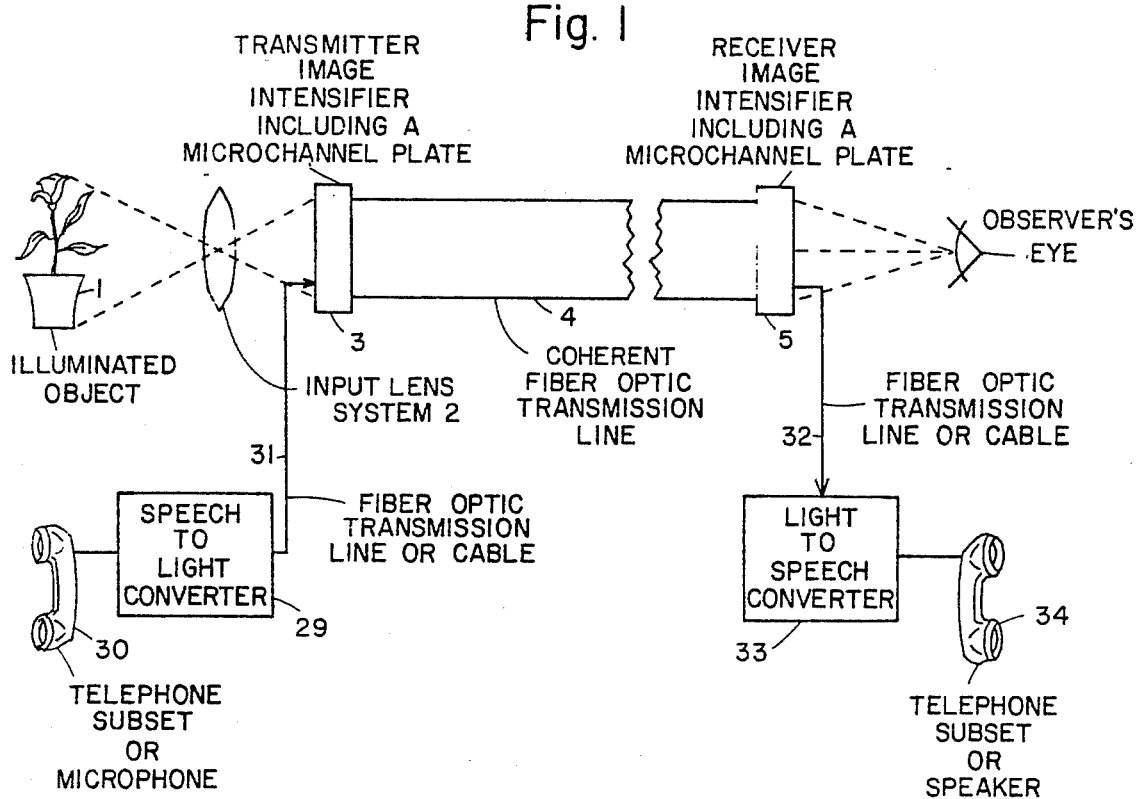
FIG. 1 is a block diagram of a combined monochromatic picture and speech communication system in accordance with the principles of the present invention.

Referring to FIG. 1 there is disclosed therein a combined speech and monochromatic picture communication system in accordance with the principles of the present invention.

The monochromatic picture communication system will first be described with reference to FIG. 1. The illuminated object 1, such as the illustrated flowerpot, is imaged by an input lens system 2 onto the input fiber optic faceplate of the transmitter image intensifier 3. Image intensifier 3 is preferably a proximity focused planar device including a microchannel plate for image amplification. The structure and operation of such a device is fully disclosed in the January 1972 Technical Memorandum EOTM 7201 of The Bendix Corporation Electro Optics Division, authored by L. D. Owen and entitled "The Proximity Focused Image Intensifier".

However, it should be noted that the image intensifier need not be limited to devices having a planar configuration. For example, it would be possible to provide a device that would enable image amplification dimensionally as well as in signal intensity. Also, the configuration of the microchannel plate may be altered to suit the design objectives. For instance, the channel within the plate need not be rectilinear as commonly employed. Spacing between holes in the microchannel plate may also be varied in order to minimize signal crosstalk within the device. The holes may be tapered either converging or diverging in order to optimize the design for a specific application.

The image of object 1 on the photo cathode of image intensifier 3 is amplified in the microchannel plate by accelerating the photo electrons emitted by the photo cathode into the microchannel plate of intensifier 3 to produce secondary electrons. The secondary electrons produce more electrons etc., which are accelerated against the phosphor coated anode of the microchannel plate intensifier 3 thus producing visible radiation and an image on the phosphor surface. This image is conveyed through the fiber optical faceplate of intensifier 3 and coupled either optically or directly into a coherent fiber optic transmission line 4 which may be a single conductor fiber optic transmission line or a bundle of a plurality of fiber optic conductors depending on the coupling means. The amplified image at the input of transmission line 4 is transmitted there along to the receiver end of transmission line 4. A receiver image intensifier 5 is coupled either optically or directly to the receiver end of transmission line 4 and preferably would be constructed in the same manner described hereinabove with respect to intensifier 3. Both the transmit end and receiver end of transmission line 4 are optically formed to interface and couple directly to or against the fiber optic faceplates of intensifiers 3 and 5 so that little or no energy coherency of the image is lost or radiated outside the communication system. One example of optical coupling is achieved through use of a lens which focuses the visible image formed at the output of transmitter image intensifier 3 onto the input end of transmission line 4. Similarly a lens focuses the output image of transmission line 4 onto the input of image intensifier 5.

At the receiver end of transmission line 4, intensifier 5 through its input fiber optic faceplate transfers the diminished intensity transmitted image to the photo cathode where photo electrons are produced and accelerated into the microchannel plate where secondary electrons are produced. These secondary electrons corresponding to the various picture elements are amplified by the action of the microchannel plate and accelerated to the phosphor coated anode to reproduce the input image at the input of intensifier 3 at the output of intensifier 5. The image output of intensifier 5 is directly observable and visible to the observer.

Figure 2:
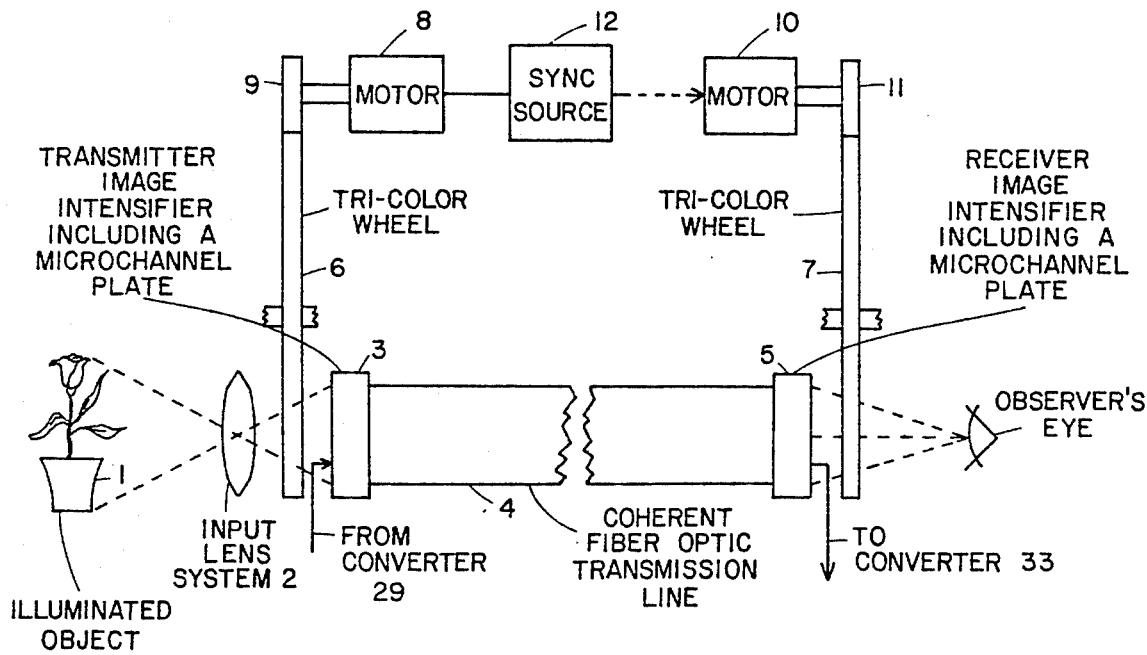
FIG. 2 is a block diagram of a field sequential picture color communication system of a combined speech and color picture communication system in accordance with the principles of the present invention.

Referring to FIG. 2 the picture communication system illustrated is a field sequential color picture communication system. The structure and operation of the field sequential color picture communication system of FIG. 2 is the same as that disclosed hereinabove with respect to the monochromatic system of FIG. 1, except that a tri-color (red, green and blue) colored light transmitting filter wheel 6 is inserted in the light path forming the input image for the transmitter image intensifier 3. A similar tri-color wheel 7 is inserted between the output of receiver image intensifier 5 and the observer. The observer sees a fully colored reproduction of the object. Wheel 6 is driven by motor 8 by either friction, gearing or other mechanical coupling between the periphery of wheel 9 and the periphery of wheel 6. Alternatively the periphery of wheel 6 could be toothed so as to engage teeth formed on the periphery of wheel 9. Similarly wheel 7 is driven by motor 10 through means of a friction wheel or gear 11. Motors 8 and 10 are synchronized, for instance, by sync source 12. Motors 8 and 10 may be synchronized by any of the conventional means such as is commonly used with the Columbia Broadcasting System field sequential system. Recent advances in driver or prime mover technology now makes this an acceptable, viable design. In addition, synchronization can be locally derived by a clock pulse, such as derived from an atomic clock, eliminating the necessity for transmission of sync pulses from source 12 to motors 8 and 10. In this arrangement whenever the motors are turned on they automatically maintain synchronization due to the effect of the atomic clock generated clock pulse. A simple manual adjustment of the picture at the receiver end of transmission line 4 accomplishes proper correspondence or matching of color field.

Figure 3:
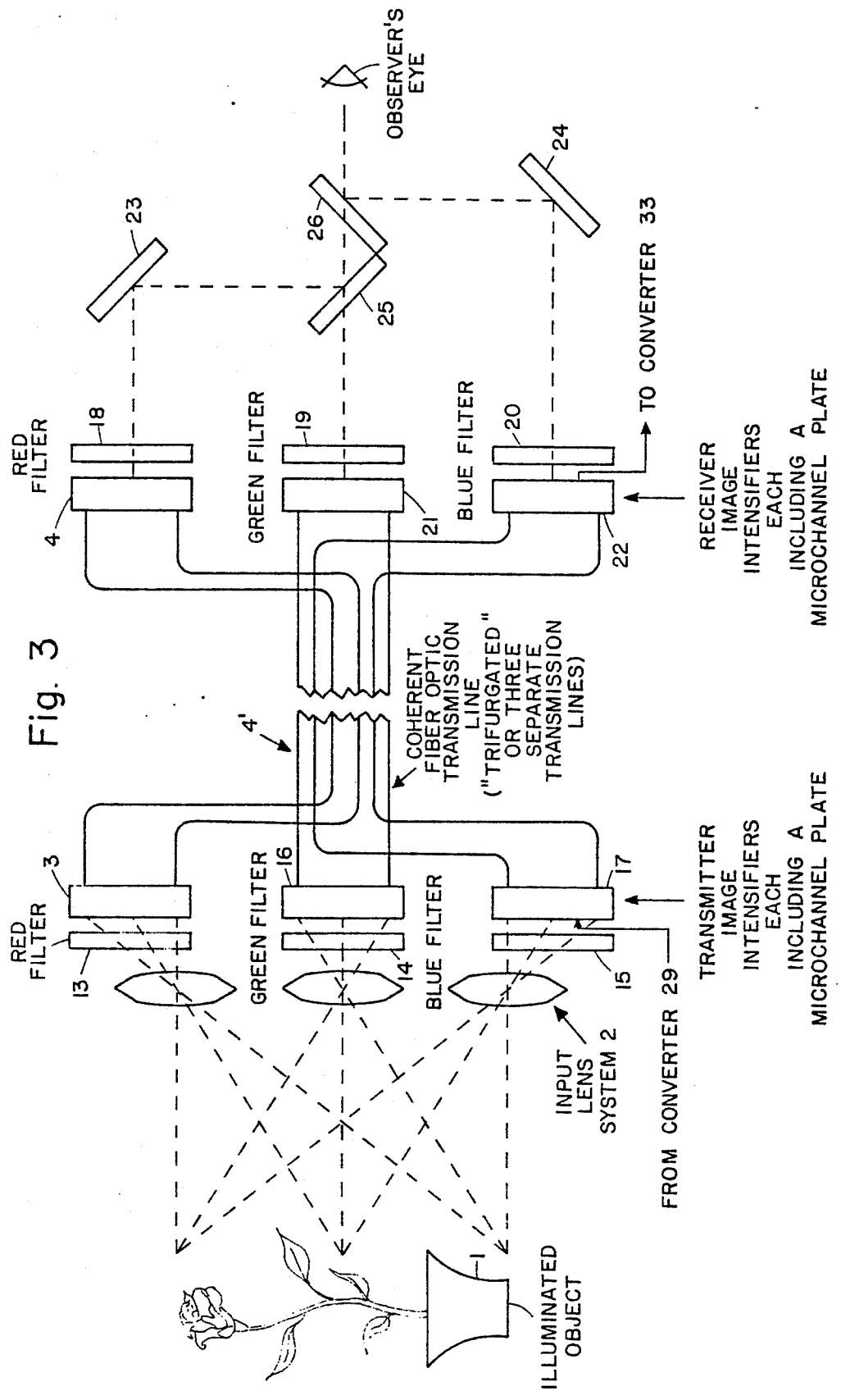
FIG. 3 is a block diagram of a simultaneous color picture communication system of a combined color picture and speech communication system in accordance with the principles of the present invention.

Referring to FIG. 3 a simultaneous color picture communication system is illustrated. The basic system consists of three monochromatic systems as disclosed and described with respect to FIG. 1. Colored filters, such as red light transmitting filter 13, green light transmitting filter 14 and blue light transmitting filter 15 are placed appropriately in front of the input images to the transmitter image intensifiers 3, 16 and 17. Red light transmitting filter 18, green light transmitting filter 19 and blue light transmitting filter 20 are placed adjacent the output of image intensifiers 4, 21 and 22. The intensifiers 3, 4, 16, 17, 21 and 22 are identical in structure and operation to that described hereinabove with respect to intensifier 3 of FIG. 1. The three separate white image outputs of intensifiers 3, 16 and 17 corresponding to the three separate colored inputs are coupled on a coherent fiber optic transmission line 4' which may be trifurcated as illustrated, or may be three separate transmission lines. The color of the output images of the intensifiers is determined by the phosphor used in the anode of the intensifier. For reasons of economy all intensifiers employed in the system of FIG. 3 will produce a white image output corresponding to the colored light passed by the associated colored filter. The image intensifiers at both the input and output of the sections of the trifurcated fiber optic transmission lines, or the three separate transmission lines are associated with a light transmitting filter at the input to the transmitter image intensifier and at the output of the receiver image intensifier capable of transmitting the same colored light. It should be noted that the three separate white image outputs transmitted on transmission line 4' are converted to three separate colored outputs corresponding to the three separate color inputs to intensifiers 3, 16 and 17 by the three colored filters 18, 19 and 20.

At the receiver end, the three colored output images from filters 18, 19 and 20 are recombined by means of the mirror system shown. Mirrors 23 and 24 are front surfaced, silver coated type mirrors with mirror 23 reflecting the red light of the amplified transmitted image from intensifier 4 and mirror 24 reflecting the blue light of the amplified transmitted image at the output of intensifier 22. Mirror 25 reflects the red light from mirror 23 toward the observer and passes the green light of the amplified transmitted image at the output of intensifier 21 toward the observer. Mirror 26 passes the reflected red light from mirror 25 and the transmitted green light of mirror 25 toward the observer and at the same time reflects the reflected blue light from mirror 24 toward the observer. As a result thereof, the observer is presented with a full color image of the picture of illuminated object 1.

Figure 4:
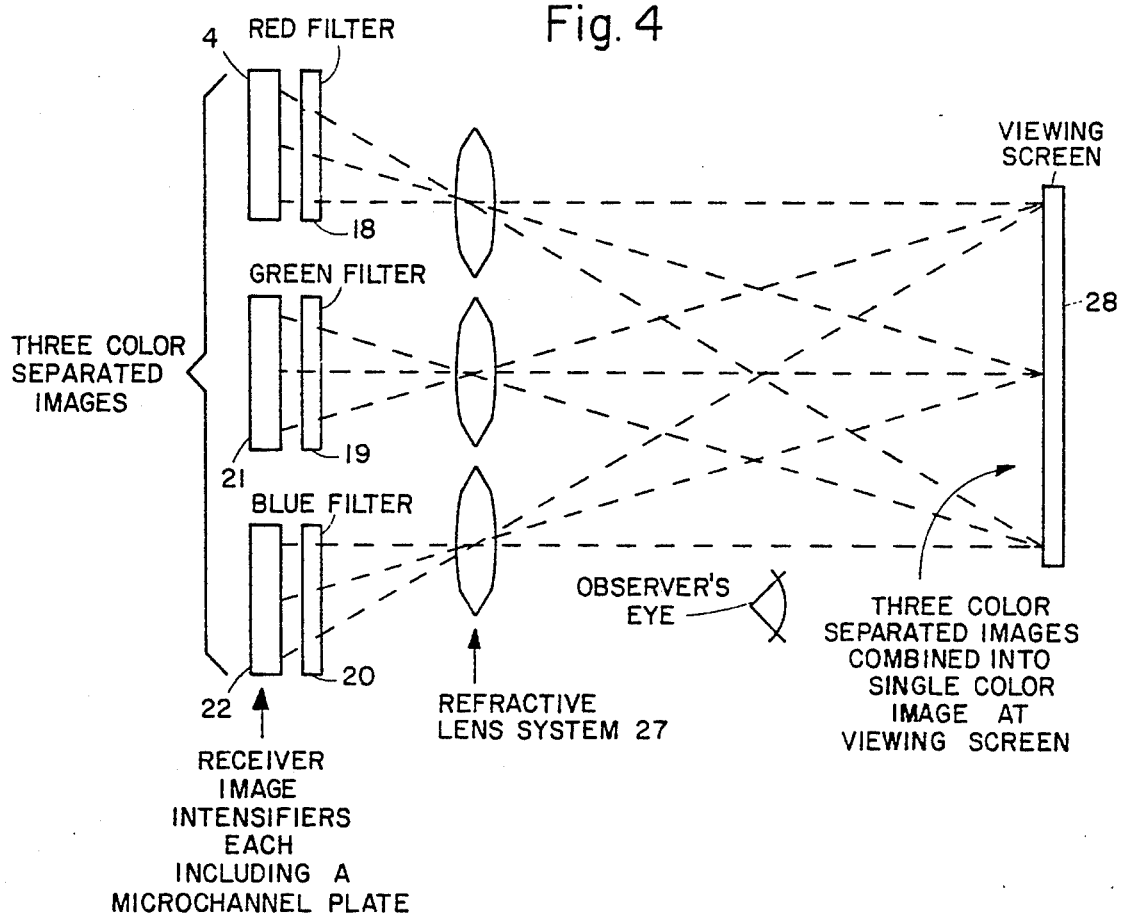
FIG. 4 is a block diagram of a refractive system for optically combining three color separated image fields that may be substituted for the mirror combiner of FIG. 3 in accordance with the principles of the present invention.

Other means for combining the three color separated images of the color picture communication system of FIG. 3 are possible. For example, as illustrated in FIG. 4 a refractive lens system 27 may be employed to combine the separated colored images. The three color separated images present at the output of filters 18, 19 and 20 placed in front of the image intensifiers 4, 21 and 22 are passed through the refractive lens system 27 to a viewing screen 28 wherein the three color separated images are combined into a single color image for viewing by the observer.

The picture communication systems described hereinabove with respect to FIGS. 1–3 all have the inherent capability of transmitting speech signals. As illustrated in FIG. 1, this is accomplished in each of the picture phones of FIGS. 1–3 by a speech to light converter 29 which converts the speech from telephone subset or microphone 30 into speech modulated light. Converter 29 may be implemented by a light emitting diode whose output light intensity is varied proportional to the amplitude of the speech signal received from subset 30. The speech modulated light is coupled by fiber optic transmission line or cable 31 to the input faceplate of image intensifier 3. The speech modulated light is amplified by the microchannel plate of intensifier 3 in a manner similar to the amplification of the image of object 1 described hereinabove. The amplified speech modulated light is transmitted on transmission line 4 together with the transmitted image of object 1. The transmitted speech modulated light is again amplified in receiver image intensifier 5 through the action of the microchannel plate and is then coupled to a fiber optic transmission line or cable 32. Cable 32 is coupled to a light to speech converter 33 with the resultant speech correspondig to the speech of the subset or microphone 30 being coupled to telephone subset or speaker 34 for utilization. Converter 33 may be implemented by a photo electric diode which produces an electrical output proportional to the intensity of the speech modulated light applied thereto from cable 32. The transmitted speech modulated light and the transmitted picture image are maintained separate from one another by employing a single fiber optic conductor in a multiconductor transmission line 4 to transmit speech modulated light only, or by wavelength separation of the transmitted picture image and the transmitted speech modulated light.

Figure 5:
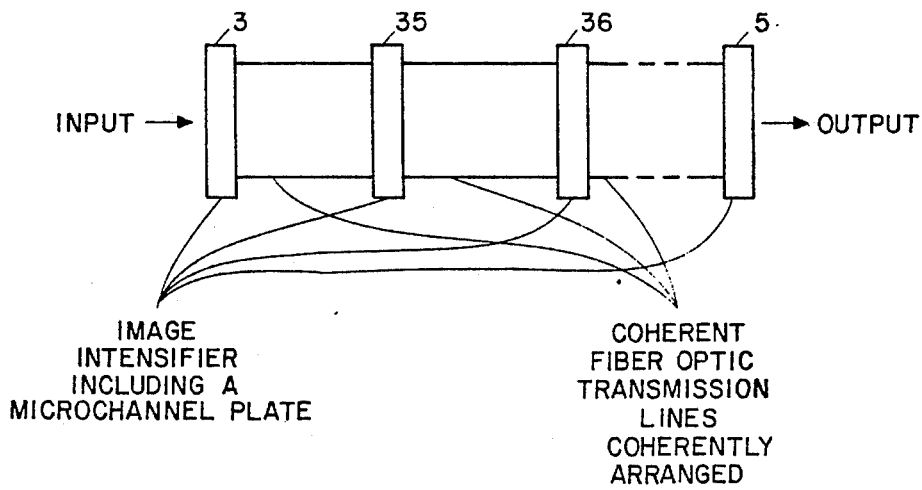
FIG. 5 is a block diagram illustrating the employment of proximity focused image intensifiers along the length of a coherent fiber optic transmission lines as in-line amplifiers or intensity boosters in accordance with the principles of the present invention.

In addition, it is possible to utilize image intensifiers as described hereinabove with respect to intensifier 3 (FIG. 1) as in-line amplifiers or intensity boosters. This is illustrated in FIG. 5 wherein one or more image intensifiers include a microchannel plate, such as image intensifiers 35 and 36, are disposed along the coherent fiber optic transmission line an appropriate distance apart so as to boost the intensity of either the image of the picture or the speech modulated light prior to reaching the receiver image intensifier 5. Such intensity boosters may be employed in the transmission line 4 of FIGS. 1 and 2 and transmission line 4' of FIG. 3 to satisfy the system design for a particular application.

While I have described above the principles of my invention in connection with specific apparatus it is to be clearly understood that this description is made only by way of example and not as a limitation to the scope of my invention as set forth in the objects thereof and in the accompanying claims.

I claim:
1. A picture communication system comprising:
at least a first image intensifier;
first means to optically couple an image of an illuminated picture to be transmitted to the input of said first intensifier;
said first intensifier providing an intensity amplified version of said image at the output thereof;
a coherent fiber optic transmission line having one end thereof optically coupled to the output of said first intensifier to transmit said amplified version of said image to the other end thereof;
at least a second image intensifier having its input optically coupled to said other end of said transmission line to intensity amplify said transmitted image at said other end of said transmission line and to reproduce said amplified transmitted image for presentation to an observer;
said first means including
a lens system to direct said image of said picture upon the input of said first intensifier;
each of said first and second intensifiers including
a proximity focused planar device having a microchannel plate for image amplification;
second means disposed between said lens system and said one end of said transmission line; and
third means disposed between said other end of said transmission line and said observer;
said second and third means cooperating to present said reproduced image as a colored image to said observer.

2. A system according to claim 1, wherein said second means includes
a first motor driven rotating tri-color wheel disposed between said lens system and the input of said first intensifier, and
said third means includes
a second motor driven rotating tri-color wheel disposed between the output of said second intensifier and said observer, the rotation of said first and second tri-color wheels being synchronized.

3. A system according to claim 2, further including
at least one additional image intensifier disposed along said transmission line between said first and second intensifiers to boost the intensity of said transmitted image.

4. A system according to claim 3, wherein said additional intensifiers include
a proximity focused planar device having a microchannel plate for image amplification.

5. A system according to claim 1, wherein said second means includes
a first red light transmitting filter dispoed between said lens system and the input of said first intensifier, to transmit red light of said image, to the input of said first intensifier,
said first intensifier providing an amplified version in white light of said red light of said image at the output thereof for transmission on said transmission line,
a third image intensifier having its output optically coupled to said transmission line,
a first green light transmitting filter disposed between said lens system and the input of said third intensifier to transmit green light of said image to the input of said third intensifier,
said third intensifier providing an amplified version in white light of said green light of said image at the output thereof,
a fourth image intensifier having its output optically coupled to said transmission line, a first blue light transmitting filter disposed between said lens system and the input of said fourth intensifier to transmit blue light of said image to the input of said fourth intensifier, said fourth intensifier providing an amplified version in white light of said blue light of said image at the output thereof; and said third means includes a second red light transmitting filter disposed adjacent the output of said second intensifier to convert said amplified transmitted image to said red light of said image, said second intensifier providing an amplified version in white light of said transmitted white light corresponding to said red light of said image at the output thereof, a fifth image intensifier having its input optically coupled to said transmission line to provide an amplified version in white light of said transmitted white light corresponding to said green light of said image at the output thereof, a second green light transmitting filter disposed adjacent the output of said fifth intensifier to convert said amplified transmitted image to said green light of said image, a sixth image intensifier having its input optically coupled to said transmission line to provide an amplified version in white light of said transmitted white light corresponding to said blue light of said image, a second blue light transmitting filter disposed adjacent the output of said sixth intensifier to convert said amplified transmitted image to said blue light of said image, and fourth means optically coupled to each of said second red, green and blue filters to combine the light transmitted therethrough to present said reproduced image as a colored image to said observer.

6. A system according to claim 5, wherein said transmission line includes a trifurcated transmission line with each component thereof providing optical communication between corresponding image intensifiers associated with said first and second red, green and blue filters.

7. A system according to claim 6, further including at least one additional image intensifier disposed along said trifurcated transmission line between the input and output thereof to boost the intensity of said transmitted images.

8. A system according to claim 7, wherein said additional intensifier includes a proximity focused planar device having a microchannel plate for image amplification.

9. A system according to claim 5, wherein said transmission line includes three separate coherent fiber optic transmission lines each transmitting white light corresponding to a different primary color of said image.

10. A system according to claim 9, further including at least one additional image intensifier disposed along each of said three transmission lines between the input and output thereof, each of said additional intensifiers boosting the intensity of the associated one of said transmitted images.

11. A system according to claim 10, wherein each of said additional intensifiers include a proximity focused planar device having a microchannel plate for image amplification.

12. A system according to claim 5, wherein said fourth means includes a first mirror optically coupled to said second red filter to reflect red light of said amplified transmitted image, a second mirror optically coupled to said second green filter and said first mirror to transmit green light of said amplified transmitted image from the output of said second green filter toward said observer and to reflect said reflected red light of said amplified transmitted image from said first mirror toward said observer, a third mirror optically coupled to said second blue filter to reflect blue light of said amplified transmitted image, and a fourth mirror optically coupled to said second and third mirrors to transmit green light and red light of said amplified transmitted image from said second mirror toward said observer and to reflect said reflected blue light of said amplified transmitted image from said third mirror toward said observer.

13. A system according to claim 5, wherein said fourth means includes a view screen to be viewed by said observer, and a refractive lens system disposed between said second red, green and blue filters and said viewing screen to combine the light transmitted through said second red, green and blue filters on said viewing screen to present said colored image to said observer.

14. A system according to claim 1, further including a speech communication system in combination with said picture communication system, said speech communication system including a source of speech;

a speech to light converter coupled to said source to convert said speech into speech modulated light;

a first fiber optic cable coupled from said speech to light converter to the input of said first intensifier to convey said speech modulated light to said first intensifier for amplification prior to transmission on said transmission line in a separated relationship with said transmitted image;

a second fiber optic cable coupled to the output of said second intensifier, said second intensifier amplifying said transmitted speech modulated light;

a light to speech converter coupled to the output of said second cable to reproduce said speech; and a utilization device coupled to the output of said light to speech converter to utilize said speech.

15. A picture communication system comprising:

at least a first image intensifier;

first means to optically couple an image of an illuminated picture to be transmitted to the input of said first intensifier;

said first intensifier providing an intensity amplified version of said image at the output thereof;

a coherent fiber optic transmission line having one end thereof optically coupled to the output of said first intensifier to transmit said amplified version of said image to the other end thereof;

at least a second image intensifier having its input optically coupled to said other end of said transmission line to intensity amplify said transmitted image at said other end of said transmission line and to reproduce said amplified transmitted image for presentation to an observer; and a speech communication system in combination with said picture communication system, said speech communication system including
- a source of speech;
- a speech to light converter coupled to said source to convert said speech into speech modulated light;
- a first fiber optic cable coupled from said speech to light converter to the input of said first intensifier to convey said speech modulated light to said first intensifier for amplification prior to transmission on said transmission line in a separated relationship with said transmitted image;
- a second fiber optic cable coupled to the output of said second intensifier, said second intensifier amplifying said transmitted speech modulated light;
- a light to speech converter coupled to the output of said second cable to reproduce said speech; and
- a utilization device coupled to the output of said light to speech converter to utilize said speech.

16. A system according to claim 15, wherein each of said first and second intensifiers include
a proximity focused planar device having a microchannel plate for image amplification.

17. A system according to claim 16, further including
second means disposed between said first means and said one end of said transmission line; and
third means disposed between said other end of said transmission line and said observer;
said second and third means cooperating to present said reproduced image as a colored image to said observer.

18. A system according to claim 17, wherein said second means includes
a first motor driven rotating tri-color wheel disposed between said first means and the input of said first intensifier, and
said third means includes
a second motor driven rotating tri-color wheel disposed between the output of said second intensifier and said observer, the rotation of said first and second tri-color wheels being synchronized.

19. A system according to claim 18, further including
at least one additional image intensifier disposed along said transmission line between said first and second intensifiers to boost the intensity of said transmitted image.

20. A system according to claim 19, wherein said additional intensifiers include
a proximity focused planar device having a microchannel plate for image amplification.

21. A system according to claim 17, wherein said second means includes
a first red light transmitting filter disposed between said first means and the input of the said first intensifier, to transmit red light of said image to the input of said first intensifier,
said first intensifier providing an amplified version in white light of said red light of said image at the output thereof for transmission on said transmission line,
a third image intensifier having its output optically coupled to said transmission line,
a first green light transmitting filter disposed between said lens system and the input of said third intensifier to transmit green light of said image to the input of said third intensifier,
said third intensifier providing an amplified version in white light of said green light of said image at the output thereof,
a fourth image intensifier having its output optically coupled to said transmission line,
a first blue light transmitting filter disposed between said first means and the input of said fourth intensifier to transmit blue light of said image to the input of said fourth intensifier,
said fourth intensifier providing an amplified version in white light of said blue light of said image at the output thereof; and
said third means includes
a second red light transmitting filter disposed adjacent the output of said second intensifier to convert said amplified transmitted image to said red light of said image,
said second intensifier providing an amplified version in white light of said transmitted white light corresponding to said red light of said image at the output thereof,
a fifth image intensifier having its input optically coupled to said transmission line to provide an amplified version in white light of said transmitted white light corresponding to said green light of said image at the output thereof,
a second green light transmitting filter disposed adjacent the output of said fifth intensifier to convert said amplified transmitted image to said green light of said image,
a sixth image intensifier having its input optically coupled to said transmission line to provide an amplified version in white light of said transmitted white light corresponding to said blue light of said image,
a second blue light transmitting filter disposed adjacent the output of said sixth intensifier to convert said amplified transmitted image to said blue light of said image, and
fourth means optically coupled to each of said second red, green and blue filters to combine the light transmitted therethrough to present said reproduced image as a colored image to said observer.

22. A system according to claim 21, wherein said transmission line includes
a trifurcated transmission line with each component thereof providing optical communication between corresponding image intensifiers associated with said first and second red, green and blue filters.

23. A system according to claim 22, further including
at least one additional image intensifier disposed along said trifurcated transmission line between the input and output thereof to boost the intensity of said transmitted images.

24. A system according to claim 23, wherein said additional intensifier includes
a proximity focused planar device having a microchannel plate for image amplification.

25. A system according to claim 21, wherein said transmission line includes
three separate coherent fiber optic transmission lines each transmitting white light corresponding to a different primary color of said image.

26. A system according to claim 25, further including
at least one additional image intensifier disposed along each of said three transmission lines between the input and output thereof, each of said additional intensifiers boosting the intensity of the associated one of said transmitted images.

27. A system according to claim 26, wherein each of said additional intensifiers include
a proximity focused planar device having a microchannel plate for image amplification.

28. A system according to claim 21, wherein said fourth means includes
a first mirror optically coupled to said second red filter to reflect red light of said amplified transmitted image,
a second mirror optically coupled to said second green filter and said first mirror to transmit green light of said amplified transmitted image from the output of said second green filter toward said observer and to reflect said reflected red light of said amplified transmitted image from said first mirror toward said observer,
a third mirror optically coupled to said second blue filter to reflect blue light of said amplified transmitted image, and
a fourth mirror optically coupled to said second and third mirrors to transmit green light and red light of said amplified transmitted image from said second mirror toward said observer and to reflect said reflected blue light of said amplified transmitted image from said third mirror toward said observer.

29. A system according to claim 21, wherein said fourth means includes
a view screen to be viewed by said observer, and
a refractive lens system disposed between said second red, green and blue filters and said viewing screen to combine the light transmitted through said second red, green and blue filters on said viewing screen to present said colored image to said observer.

30. A picture communication system comprising:
at least a first image intensifier;
first means to optically couple an image of an illuminated picture to be transmitted to the input of said first intensifier;
said first intensifier providing an intensity amplified version of said image at the output thereof;
a coherent fiber optic transmission line having one end thereof optically coupled to the output of said first intensifier to transmit said amplified version of said image to the other end thereof;
at least a second image intensifier having its input optically coupled to said other end of said transmission line to intensity amplify said transmitted image at said other end of said transmission line and to reproduce said amplified transmitted image for presentation to an observer;
second means disposed between said first means and said one end of said transmission line; and
third means disposed between said other end of said transmission line and said observer;
said second and third means cooperating to present said reproduced image as a colored image to said observer.

31. A system according to claim 30, wherein said second means includes
a first motor driven rotating tri-color wheel disposed between said first means and the input of said first intensifier, and
said third means includes
a second motor driven rotating tri-color wheel disposed between the output of said second intensifier and said observer, the rotation of said first and second tri-color wheels being synchronized.

32. A system according to claim 31, further including
at least one additional image intensifier disposed along said transmission line between said first and second intensifiers to boost the intensity of said transmitted image.

33. A system according to claim 32, further including
a speech communication system in combination with said picture communication system, said speech communication system including
a source of speech;
a speech to light converter coupled to said source to convert said speech into speech modulated light;
a first fiber optic cable coupled from said speech to light converter to the input of said first intensifier to convey said speech modulated light to said first intensifier for amplification prior to transmission on said transmission line in a separated relationship with said transmitted image;
a second fiber optic cable coupled to the output of said second intensifier, said second intensifier amplifying said transmitted speech modulated light;
a light to speech converter coupled to the output of said second cable to reproduce said speech; and
a utilization device coupled to the output of said light to speech converter to utilize said speech.

34. A system according to claim 30, wherein said second means includes
a first red light transmitting filter disposed between said first means and the input of said first intensifier, to transmit red light of said image, to the input of said first intensifier,
said first intensifier providing an amplified version in white light of said red light of said image at the output thereof for transmission on said transmission line,
a third image intensifier having its output optically coupled to said transmission line,
a first green light transmitting filter disposed between said first means and the input of said third intensifier to transmit green light to said image to the input of said third intensifier,
said third intensifier providing an amplified version in white light of said green light of said image at the output thereof,
a fourth image intensifier having its output optically coupled to said transmission line,
a first blue light transmitting filter disposed between said first means and the input of said fourth intensifier to transmit blue light of said image to the input of said fourth intensifier,
said fourth intensifier providing an amplified version in white light of said blue light of said image at the output thereof; and
said third means includes
a second red light transmitting filter disposed adjacent the output of said second intensifier to convert said amplified transmitted image to said red light of said image,
said second intensifier providing an amplified version in white light of said transmitted white light corresponding to said red light of said image at the output thereof, a fifth image intensifier having its input optically coupled to said transmission line to provide an amplified version in white light of said transmitted white light corresponding to said green light of said image at the output thereof, a second green light transmitting filter disposed adjacent the output of said fifth intensifier to convert said amplified transmitted image to said green light of said image, a sixth image intensifier having its input optically coupled to said transmission line to provide an amplified version in white light of said transmitted white light corresponding to said blue light of said image, a second blue light transmitting filter disposed adjacent the output of said sixth intensifier to convert said amplified transmitted image to said blue light of said image, and fourth means optically coupled to each of said second red, green and blue filters to combine the light transmitted therethrough to present said reproduced image as a colored image to said observer.

35. A system according to claim 34, wherein a speech communication system in combination with said picture communication system, said speech communication system including a source of speech;

a speech to light converter coupled to said source to convert said speech into speech modulated light;

a first fiber optic cable coupled from said speech to light converter to the input of said first intensifier to convey said speech modulated light to said first intensifier for amplification prior to transmission on said transmission line in a separated relationship with said transmitted image;

a second fiber optic cable coupled to the output of said second intensifier, said second intensifier amplifying said transmitted speech modulated light;

a light to speech converter coupled to the output of said second cable to reproduce said speech; and a utilization device coupled to the output of said light to speech converter to utilize said speech.

36. A system according to claim 34, wherein said transmission line includes a trifurcated transmission line with each component thereof providing optical communication between corresponding image intensifiers associated with said first and second red, green and blue filters.

37. A system according to claim 36, further including at least one additional image intensifier disposed along said trifurcated transmission line between the input and output thereof to boost the intensity of said transmitted images.

38. A system according to claim 34, wherein said transmission line includes three separate coherent fiber optic transmission lines each transmitting white light corresponding to a different primary color of said image.

39. A system according to claim 38, further including at least one additional image intensifier disposed along each of said three transmission lines between the input and output thereof, each of said additional intensifiers boosting the intensity of the associated one of said transmitted images.

40. A system according to claim 34, wherein said fourth means includes a first mirror optically coupled to said second red filter to reflect red light of said amplified transmitted image, a second mirror optically coupled to said second green filter and said first mirror to transmit green light of said amplified transmitted image from the output of said second green filter toward said observer and to reflect said reflected red light of said amplified transmitted image from said first mirror toward said observer, a third mirror optically coupled to said second blue filter to reflect blue light of said amplified transmitted image, and a fourth mirror optically coupled to said second and third mirrors to transmit green light and red light of said amplified transmitted image from said second mirror toward said observer and to reflect said reflected blue light of said amplified transmitted image from said third mirror toward said observer.

41. A system according to claim 34, wherein said fourth means includes a view screen to be viewed by said observer, and a refractive lens system disposed between said second red, green and blue filters and said viewing screen to combine the light transmitted through said second red, green and blue filters on said viewing screen to present said colored image to said observer.

* * * * *